July 18, 1961 R. E. STABNAU 2,992,524
LAWN MOWER CLEANING DEVICE
Filed March 13, 1958
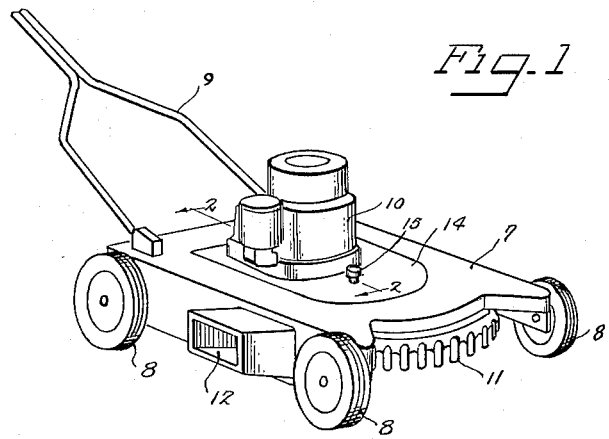
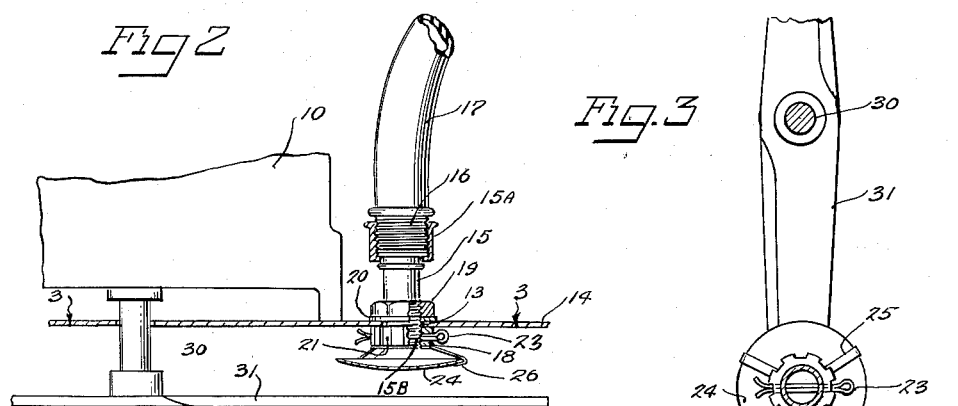
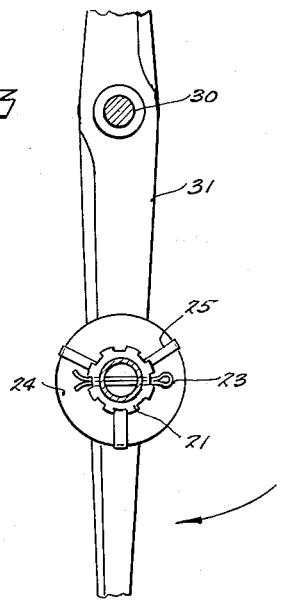
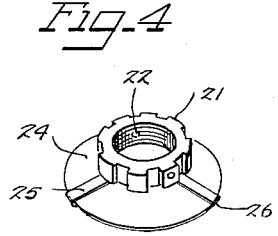
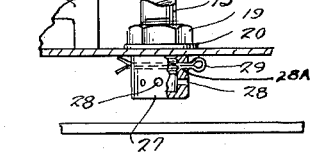
Inventor
ROY STABNAU
By Edward M. Apple
Atty { # United States Patent Office

2,992,524
LAWN MOWER CLEANING DEVICE
Roy E. Stabnau, 12054 Belleville, Belleville, Mich.
Filed Mar. 13, 1958, Ser. No. 721,132
2 Claims. (Cl. 56—25.4)

This invention relates to power lawn mowers and has particular reference to a device for cleaning lawn mowers of the rotary type, although it also could be used with the reel type mower with reasonable facility.

Rotary type lawn mowers, when in use, collect miscellaneous types of debris, such as mud, wet grass, leaves, twigs, paper and other things, which cling to the inside walls of the housing, the cutting blade, shaft and other parts of the machine. This debris, unless removed, interferes with operation of the device and causes the parts to rust, carrode and otherwise deteriorate.

Prior to my invention, it had been the practice to clean the rotary mower, by tipping it up, and manually removing the debris. That operation required the manual shifting of the cutter blade, and for the reason that the blade is mounted directly to the engine shaft, any slight rotation of the shaft, particularly when the engine is warm, can start the engine. Many persons have lost hands and have been otherwise injured as a result.

Therefore it is an object of this invention to obviate the foregoing difficulties and to provide an automatic cleaning device for a rotary type power lawn mower, which is simple in construction, economical to manufacture, simple to install and highly efficient in operation.

Another object of the invention is to provide a device for a lawn mower, which can be used with the conventional domestic water system to quickly and thoroughly wash and clean all parts of the under carriage of the machine.

Another object of the invention is to provide a device of the character indicated, which is constructed and arranged so that it may be used, when the engine of the mower is running whereby the force of the rapidly rotating cutting blade is used to further enhance its cleaning ability.

Another object of the invention is to provide a device of the character indicated which is constructed and arranged, so that the water entering the housing of the mower is evenly distributed over a wide area of the housing before it is picked up, atomized and propelled, under high pressure, by the rapidly rotating cutting blade.

Another object of the invention is to provide a device of the character indicated, which, when supplied with water under pressure, and while the engine of the mower is running, creates a pressurized fog inside the mower housing, which thoroughly scrubs and cleans all of the parts with which it comes in contact.

The foregoing and other objects and advantages of the invention will become more apparent as the description proceeds, reference being made from time to time to the accompanying drawings, in which:

FIG. 1 is a perspective view of a conventional rotary type lawn mower equipped with a device embodying the invention.

FIG. 2 is an enlarged fragmentary view, with parts in section, taken substantially on the line 2—2 of FIG. 1.

FIG. 3 is a section taken substantially on the line 3—3 of FIG. 2.

FIG. 4 is an enlarged detail, illustrating the lower nut and assembly shown in FIGS. 2 and 3.

FIG. 5 is a side elevational view of a unitray form of nut and baffle assembly which is formed by drilling the side wall of a conventional pipe cap.

Referring now more particularly to the drawings, it will be understood that in the embodiment herein disclosed, the reference character 7 indicates the housing of a rotary type lawn mower, which is provided with rubber tired wheels 8, a handle 9 and a gasoline engine 10. The housing 7 is provided at the front end, with a comb like structure 11, for receiving the grass to be cut, and at one side with a discharge opening 12, through which the grass, which has been cut, is ejected. The elements just described are conventional, and form no part of the invention, except as they are combined with the structure which I will now describe.

Mounted in a suitable opening 13 (FIG. 2) formed in the upper wall 14, of the housing 7, is a hose connection 15, which has an internally threaded nut 15A and is arranged to receive the externally threaded fitting 16, which is part of a conventional garden hose 17. The hose connection 15 is externally threaded, as at 18, and is arranged to receive a lock nut 19, and lock washer 20, both of which are positioned on top of the wall 14, of the housing 7, and a second nut 21, which is positioned below the wall 14. The second nut 21 and the member 15 are provided with aligned apertures 22 (FIG. 4), for receiving a cotter pin 23, to prevent the nut from being displaced by the vibration of the engine. The discharge end 15B of the hose connection 15 is spaced from the plane of rotation of the blade 31.

In order to distribute the water coming through the hose 17 and the member 15 over a wide area, the member 15 is provided with a baffle 24, which is secured to the nut 21, in spaced relation, by means of a spider 25, which is preferably welded to the under side of the nut 21. The legs of the spider 25 are bent under the baffle 24, as at 26, to secure the baffle in position.

In FIG. 5, I show a modified, unitary, form of nut and baffle assembly, which I prefer to make from a conventional pipe cap 27. The side walls of the cap 27 and the walls of the member 15 are drilled, as at 28, so that the water may be distributed in a transverse direction. In this modification, the pipe cap 27 and the member 15 are also drilled to provide aligned apertures 28A for receiving the cotter pin 29, as previously described.

It will be noted in FIG. 2, that the device embodying the invention, is located in the wall 14 of the housing 7, in a position relatively close to the engine 10, and in spaced relation to the shaft 30 of the engine, which rotates the cutting blade 31 of the mower.

In operation a conventional garden hose is secured to the member 15, so that a stream of water is directed to the interior of the housing 7, which stream of water is distributed in a circular pattern by the concave baffle 24. The engine 10 is then started, whereby the cutting blade 31 is rotated at high speed. The highly rotating cutting blade 31 picks up the water entering the housing 7, and breaks it up into a fine mist, which is directed with great force and velocity against all parts of the mower within the housing, thereby scrubbing and washing the mower of any and all accumulations of foreign particles and debris as herein above indicated.

Thus it will be seen that I have devised a novel means for cleaning a rotary type lawn mower, while the same remains in a normal position on the ground, and without the necessity of tipping the mower for any manual manipulation.

Having described my invention what I desire to secure by Letters Patent is:

1. A device of the character described, for use with a rotary type lawn mower having a cowling and a cutting blade rotatable therein, comprising a conduit having a threaded portion extending through the upper wall of said cowling and terminating in the area defined in part by said wall and the plane of rotation of said blade, there being a threaded element at each end of said conduit, one of said threaded elements having secured thereto a saucer-like baffle which distributes water from said conduit in a wide circle parallel with the rotation of said blade, the other of said threaded elements being adapted to receive the threaded fitting of a garden hose, there being a third threaded element on said conduit for exerting pressure on the upper face of said wall.

2. A device of the character described, for use with a rotary type lawn mower having a cowling and a cutting blade rotatable therein, comprising a conduit having a threaded portion extending through the upper wall of said cowling and terminating in the area defined in part by said wall and the plane of rotation of said blade, there being a threaded element at each end of said conduit, one of said threaded elements consisting of a pipe cap having a plurality of radial bores therein, which serve to discharge water from said conduit in a plane substantially parallel with the plane of rotation of said blade, the other of said threaded elements being arranged to receive the threaded fitting of a garden hose, there being a third threaded element on said conduit for exerting pressure on said wall.

References Cited in the file of this patent

UNITED STATES PATENTS

| | | |
|---|---|---|
| 1,336,257 | Muzzy | Apr. 6, 1920 |
| 1,631,381 | Nelson | June 7, 1927 |
| 1,752,823 | Walker | Apr. 1, 1930 |
| 2,155,220 | Ehret | Apr. 18, 1939 |
| 2,504,416 | Hileman | Apr. 18, 1950 |
| 2,566,324 | Frese | Sept. 4, 1951 |
| 2,639,947 | Tramm et al. | May 26, 1953 |
| 2,650,132 | Reinecke | Aug. 25, 1953 |
| 2,742,751 | Laughlin | Apr. 24, 1956 |
| 2,796,714 | Denney | June 25, 1957 |
| 2,936,563 | Blume | May 17, 1960 |